United States Patent [19]

Münscher

[11] 4,438,458
[45] Mar. 20, 1984

[54] DATA DISPLAY DEVICE
[75] Inventor: Wolfgang Münscher, Munich, Fed. Rep. of Germany
[73] Assignee: Siemens Aktiengesellschaft, Berlin and Munich, Fed. Rep. of Germany
[21] Appl. No.: 343,958
[22] Filed: Jan. 29, 1982
[30] Foreign Application Priority Data
Feb. 16, 1981 [DE] Fed. Rep. of Germany ....... 3105601
[51] Int. Cl.³ .......................... H04N 5/64; H04N 5/655
[52] U.S. Cl. ...................................... 358/254; 248/184; 312/251; 340/700; 358/249
[58] Field of Search ......................... 358/248, 249, 254; 340/700; D14/77–82, 106, 113; 248/161, 184, 407, 423, 447, 454, 456, 457, 461, 462, 185, 284; 312/7.1, 7.2, 248, 251, 253, 254

[56] References Cited
FOREIGN PATENT DOCUMENTS
2847135 5/1980 Fed. Rep. of Germany ...... 340/700

Primary Examiner—Joseph A. Orsino, Jr.
Attorney, Agent, or Firm—Herbert L. Lerner; Laurence A. Greenberg

[57] ABSTRACT

Data display device, including a plate-shaped flat pedestal part having a rectangular base with four sides, front, rear and lateral edges, and an upper surface having a recess formed therein parallel to the lateral edges, a plate-shaped screen part being disposed on top of the pedestal part and having a given surface area facing away from the pedestal part, a lower surface, front and rear edges and narrow sides, a display field substantially taking up the given surface area, an extended swivel arm support having one end being pivotable along an axis in vicinity of the upper rear edge of the pedestal part and another end being pivotable along an axis in vicinity of the lower rear edge of the screen part for supporting the screen part on the pedestal part, the axes being parallel to the upper rear edge of the pedestal part, the swivel arm being movable into a position in the recess flush with the upper surface of the pedestal part, the screen part being pivotable into a perpendicular position with respect to the pedestal part with the swivel arm in the flush position displaying a continuous planar frontal surface, and the screen part being pivotable into a parallel position with respect to the pedestal part with the swivel arm in the flush position and the screen part resting on the pedestal part with the narrow sides of the screen part at least substantially in alignment with two of the sides of the pedestal part.

6 Claims, 4 Drawing Figures

DATA DISPLAY DEVICE

The invention relates to a data display device including (a) a plate-shaped flat, supported pedestal part having a rectangular base;
(b) an equally plate-shaped screen part disposed on top of the pedestal part, the surface area of the screen part facing away from the pedestal part being substantially taken up by a display field; and
(c) an extended support element, which is anchored at one of its ends (the pedestal part end) in the pedestal part, and holds up the screen part with its other end (the screen part end).

This type of data monitor is described in German Published, Non-Prosecuted Application DE-OS No. 18 11 272, corresponding to U.S. Pat. No. 3,622,829.

With known display devices such as these, the screen component rests on a pedestal-based column in its upwardly tilted position, the column being anchored at a respectively central point in both components. Such a construction is relatively stable and additionally has the capability of providing all-around rotatable supporting of the screen component in a simple manner, e.g., by a ball-and-socket joint built into the head of the column. Another more expensive feature, however, would be to also provide the picture screen with a vertically adjustable capability. Another drawback is the fact that this device has a considerably bulky type of construction, which complicates its transport and shipment, and practically renders its operation in a suspended position impossible. This is a key problem primarily because it is just this key advantage of the display device disclosed in the above-mentioned German application and U.S. Patent, namely the reduced sectional depth of the picture screen, that has no real validity.

It is accordingly an object of the invention to provide a data display device which overcomes the hereinafore-mentioned disadvantages of the heretofore-known devices of this general type, and one having an adjustable screen component, which presents no problems with regard to placing it into a compact transport and wall suspension position, and which in this position is simply and non-tiltably, or stably, assembled, and last but not least satisfies the requirements of the user in an esthetic way.

With the foregoing and other objects in view there is provided, in accordance with the invention, a data display device, comprising a plate or panel-shaped flat pedestal part having a rectangular base with four sides, front, rear and lateral edges, and an upper surface having a recess or depression formed therein parallel to the lateral edges, an equally plate or panel-shaped screen part being disposed on top of the pedestal part and having a given surface area facing away from the pedestal part, a lower surface, front and rear edges and narrow sides, a display field substantially taking up the given surface area, an extended swivel arm support having one end being pivotable along an axis in vicinity of the upper rear edge of the pedestal part and another end being pivotable along an axis in vicinity of the lower rear edge of the screen part for supporting the screen part on the pedestal part, the axes being parallel to the upper rear edge of the pedestal part, the swivel arm being movable into a recessed or folded position in the recess flush with the upper surface of the pedestal part, the screen part being pivotable into a perpendicular position with respect to the pedestal part with the swivel arm in the flush position displaying or offering to a viewer a continuous planar frontal surface, and the screen part being pivotable or tiltable into a parallel position with respect to the pedestal part with the swivel arm in the flush position and the screen part resting on the pedestal part with the narrow or short sides of the screen part at least substantially in alignment with two of the sides of the pedestal part.

In accordance with another feature of the invention, the pedestal and screen parts have at least substantially the same dimensions.

In accordance with a further feature of the invention, the pedestal part has two opposite narrow sides and a lower surface having two recesses formed therein at the narrow sides thereof.

In accordance with an added feature of the invention, the narrow sides of the pedestal part are the front and rear sides.

In accordance with an additional feature of the invention, there are provided power supply components disposed in the pedestal part.

In accordance with a concomitant feature of the invention, there are provided interface components disposed in the pedestal part.

Other features which are considered as characteristics for the invention are set forth in the appended claims.

Although the invention is illustrated and described herein as embodied in a data display device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
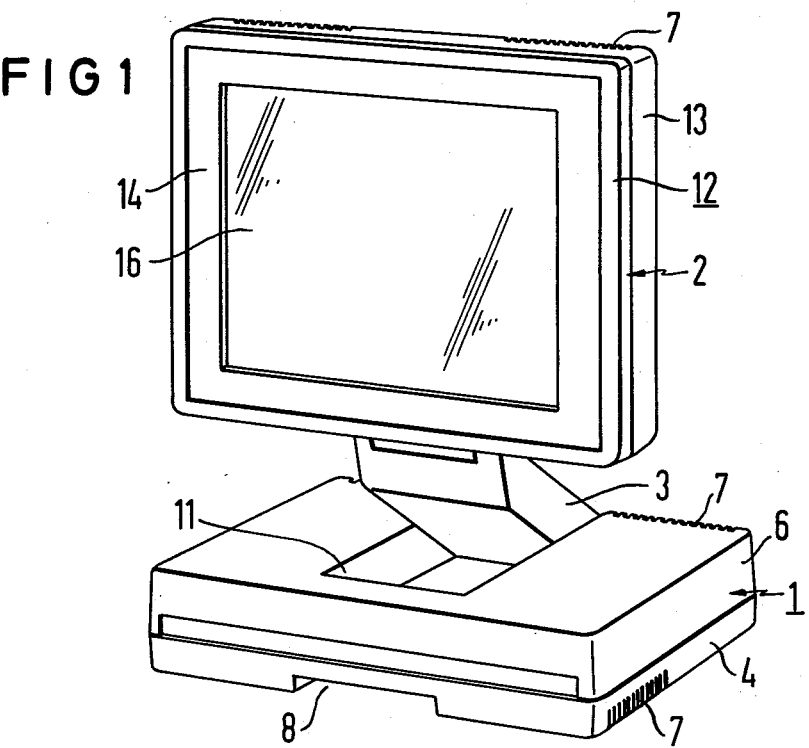
FIG. 1 is a diagrammatic front perspective view of an embodiment of the invention, with the screen component in an upright position.
Figure 2:
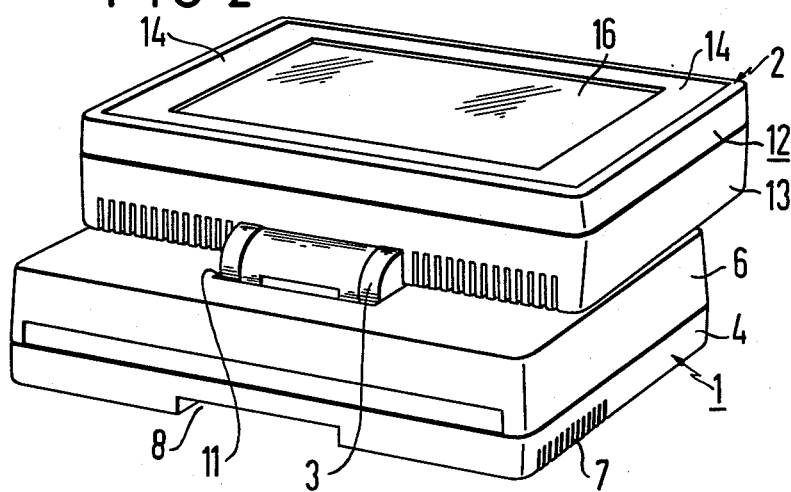
FIG. 2 is a perspective view similar to FIG. 1, with the screen component in a horizontal position.
Figure 3:
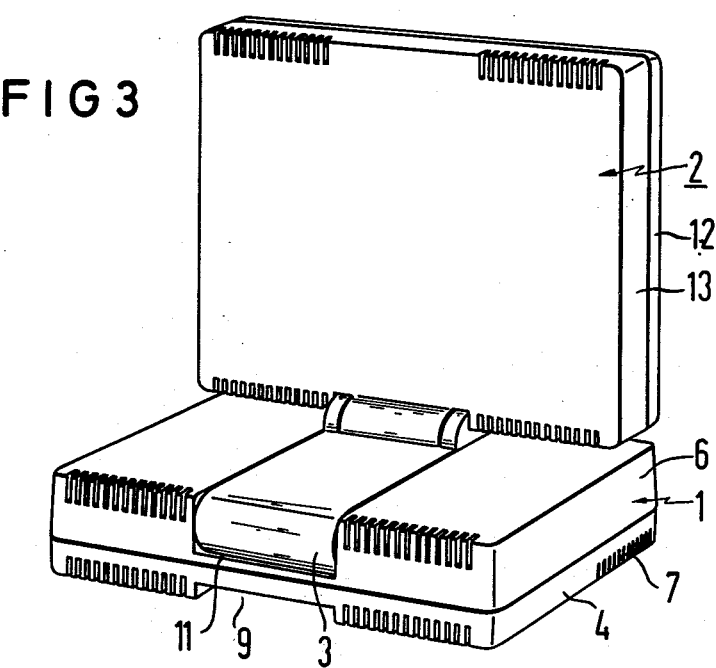
FIG. 3 is a rear perspective view of the device of the invention, with the screen component tilted up.
Figure 4:
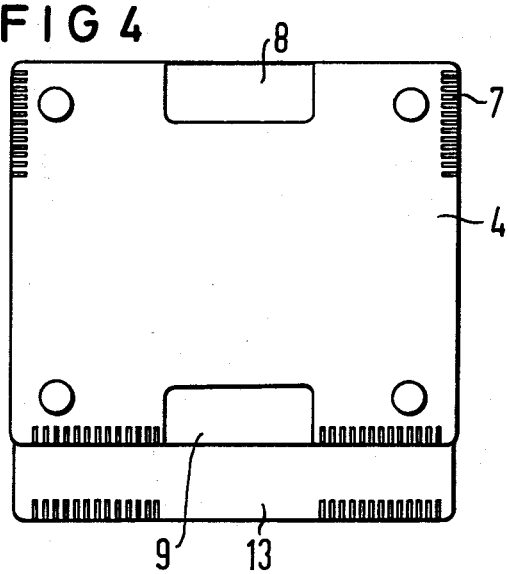
FIG. 4 is a bottom plan view of the device in the screen component position shown in FIG. 3.

Referring now to the figures of the drawing as a whole in which matching parts have identical reference symbols, there is seen a data monitor which serves as the display device or video receiver of a data processing system. The device substantially includes three parts: a plate-shaped or laminar flat pedestal part 1, a similarly dimensioned plate-shaped screen part 2, and a swivel or pivot arm 3 interconnecting the plates.

The pedestal component 1 includes two halves superposed on each other, in the form of a bottom part 4 and a top part 6. In the vicinity of the edge thereof, both halves are provided with ventilating ducts or louver slots 7, from which the resulting heat can escape. Two recesses or depressions 8, 9 are cut or machined on the lower side of the pedestal component 1. These recesses, which are located in the vicinity of the front or the rear edge, respectively, and are accessible from the sides of the pedestal component 1, act as auxiliary grips or are used to accomodate cable outlets. The upper side of the pedestal component 1 is similarly recessed at one point. This recess, designated with reference symbol 11, extends from the center of the rear edge parallel to the lateral edges and almost to the front edge. The recess 11 receives the swivel arm 3, which is pivotably or rotatably mounted in the vicinity of the rear edge on the pedestal component 1, and in its folded position 3 forms a common continuous plane with the upper side of the pedestal component 1. The other end of the swivel arm 3 is pivotably or rotatably connected to the screen component 2. The swiveling or turning axes are parallel to each other; they run level with and across the swivel arm extension. The screen component 2 is also composed of two halves equipped with ventilating ducts or louver slots 7, a front part 12 and a rear part 13. The front of the front part 12 is in the form of a frame 14, which frames in an indication or display field 16.

The screen component 2 can be placed at various heights or levels and can be tilted from a slightly overhung inclined position back again to a horizontal position. In this way the key ergonomic or bio-engineering requirements with respect to the viewing angle area of the display are met. At a vertical setting of the screen component 2 with the swivel arm 3 recessed, the front side of the screen component is flush with the frontal narrow side of the pedestal component 1, so that the observer is confronted with a practically continuous surface without any optically interfering breaks and gaps. At a horizontal setting of the screen component 2 with the swivel arm 3 recessed, the screen part 2 applied to the pedestal component 1 is aligned with it on the left and the right. In this position the device or unit can be comfortably carried, packaged and shipped, and if required can also be hung on a wall.

In the above-described case, the unit is constructed in such a way that the screen component 2 can be manually positioned to any required setting, and can be kept in this position without any additional locking. In specified cases, an adjusting or timing mechanism is preferably provided, so that swiveling motions can be electrically controlled.

Normally any electronic feature required for this display device will have to be distributed over the individual units of the device as follows: The screen component containing only the flat or modular display including the control modules is fixed directly onto the display, while in the pedestal component the power supply and interface components are accommodated. This distribution assures that the pedestal component produces a sufficient counterweight for the screen component. The flat display itself would operate according to the display principle as described in German Published, Non-Prosecuted Application DE-OS No. 18 11 272, corresponding to U.S. Pat. No. 3,622,829, wherein a plasma electron gun in the rear space provides electrons for gating or feeding them though selected holes of a control disk to a forward space, for reaccelerating them there and finally guiding them onto a luminescent screen. If the gaseous discharge, as provided in German patent DE-PS 24 12 969, is thereby produced between a relatively large areal cathode on the rear side and one of the control disk lines, then the flat display screen can also be used for maximal quantities of data, e.g., color TV pictures, at an acceptable quality level.

The invention is not limited to the described and illustrated embodiment. Thus the shape and dimensioning of the units of the device throughout can be further modified without departing from the proposed scope of the embodiment. For example, the screen component is in no way bound by the same format as the pedestal component; or the swivel arm could itself be constructed for accomodating space for components, up to a complete power supply.

I claim:

1. Data display device, comprising a plate-shaped flat pedestal part having a rectangular base with four sides, front, rear and lateral edges, and an upper surface having a recess formed therein parallel to said lateral edges, a plate-shaped screen part being disposed on top of said pedestal part and having a given surface area facing away from said pedestal part, a lower surface, front and rear edges and narrow sides, a display field substantially taking up said given surface area, an extended swivel arm support having one end being pivotable along an axis in vicinity of said upper rear edge of said pedestal part and another end being pivotable along the axis in vicinity of said lower rear edge of said screen part for supporting said screen part on said pedestal part, said axes being parallel to said upper rear edge of said pedestal part, said swivel arm being movable into a position in said recess flush with said upper surface of said pedestal part, said screen part being pivotable into a perpendicular position with respect to said pedestal part with said swivel arm in said flush position displaying a continuous planar frontal surface, and said screen part being pivotable into a parallel position with respect to said pedestal part with said swivel arm in said flush position and said screen part resting on said pedestal part with said narrow sides of said screen part at least substantially in alignment with two of said sides of said pedestal part.

2. Data display device according to claim 1, wherein said pedestal and screen parts have at least substantially the same dimensions.

3. Data display device according to claim 1 or 2, wherein said pedestal part has two opposite narrow sides and a lower surface having two recesses formed therein at said narrow sides thereof.

4. Data display device according to claim 3, wherein said narrow sides of said pedestal part are said front and rear sides.

5. Data display device according to claim 1 or 2, including power supply components disposed in said pedestal part.

6. Data display device according to claim 5, including interface components disposed in said pedestal part.

* * * * *